ELECTRIC CURRENT CONVERTING CIRCUIT

Filed Sept. 16, 1968

INVENTORS.
SHINICHIRO OGAWA
TOSHIYUKI MATSUDA
BY Lockwood D. Burton
ATTORNEY

United States Patent Office 3,544,816
Patented Dec. 1, 1970

3,544,816
ELECTRIC CURRENT CONVERTING CIRCUIT

Shinichiro Ogawa and Toshiyuki Matsuda, Tokyo, Japan, assignors to Honeywell Inc., Minneapolis, Minn., a corporation of Delaware Filed Sept. 16, 1968, Ser. No. 759,946
Claims priority, application Japan, Sept. 18, 1967, 42/59,394
Int. Cl. H03k 3/26
U.S. Cl. 307—270 1 Claim

ABSTRACT OF THE DISCLOSURE

A first serial connection comprises a first resistor, a first transistor and a first load. A second serial connection comprises a second load, a second transistor, a second resistor and a third load. The first serial connection is connected parallel to the second serial connection. A current of a magnitude proportional to the magnitude of the current in the first load is obtained in the second and third loads. Between the first and second serial connections a filter circuit is provided.

BACKGROUND OF THE INVENTION

This invention relates to an electric current converting circuit and more particularly to an electric current converting circuit in a direct current operational circuit in which one of the terminals of a plurality of loads or operational circuits is connected to the fixed potential of a power source.

SUMMARY OF THE INVENTION

In the invention of subject application, a first serial circuit comprised of a first resistor, a first transistor and a first load is connected across a constant current source and a second serial circuit comprised of a second load, a second transistor, a second resistor and a third load is connected across a current source. The first resistor and the first transistor are connected parallel to the second resistor and the second transistor through a filter circuit comprised of a resistor and a capacitor. When the voltage across the base electrode and the emitter electrode of the first transistor is made substantially equal to the voltage across the base electrode and the emitter electrode of the second transistor, the current in the second load and the third load can be made proportional to the current in the first load.

Therefore, the object of this invention is to obtain an electric current converting circuit which is capable of supplying current to the above loads simultaneously.

Another object of this invention is to obtain an electric current converting circuit which is capable of removing unnecessary high frequency components from the above loads.

DESCRIPTION OF THE PREFERRED EMBODIMENTS

Figure 1:
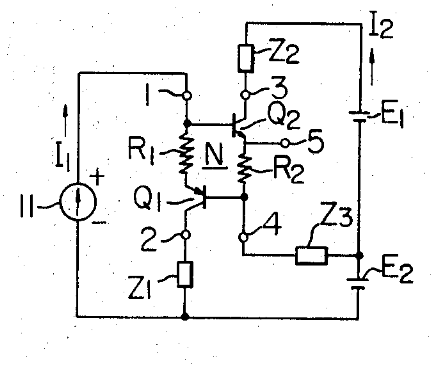
FIGS. 1 through 5 are connection diagrams showing the basic circuits and variations of the electric current converting circuit of this invention.

In FIG. 1, the emitter of a PNP transistor $Q_1$ is connected to a terminal 1 and the base of an NPN type transistor $Q_2$ through a resistor $R_1$ and the emitter of the transistor $Q_2$ is connected to a terminal 4 and the base of the transistor $Q_1$ through a resistor $R_2$. The collector of the transistor $Q_1$ is connected to the negative terminal of a constant current source 11 and the negative terminal of a power source $E_2$ through a terminal 2 and a load or operational circuit $Z_1$ and the positive terminal of constant current source 11 is connected to terminal 1.

The collector of the transistor $Q_2$ is connected to the positive terminal of a power source $E_1$ through a terminal 3 and a load or an operational circuit $Z_2$ and the negative terminal of the power source $E_1$ is connected to the positive terminal of the power source $E_2$ and a terminal of a load or an operational circuit $Z_3$. The other terminal of the load $Z_3$ is connected to terminal 4 and the joint between the emitter of the transistor $Q_2$ and the resistor $R_2$ forms a terminal 5.

The circuit surrounded by terminals 1, 2, 3 and 4 is named a 4-terminal network N. The resistors $R_1$ and $R_2$ perform the function to determine the conversion characteristics.

In the circuit of FIG. 1, if constant current source 11 generates a current $I_1$ in the direction shown in the figure, a voltage V across terminals 1 and 4 is represented by $$V=I_1R_1+V_{be1}$$

where:

$R_1$=resistance of resistor $R_1$
$V_{be1}$=voltage across base and emitter of the transistor $Q_1$.

The transistors $Q_1$ and $Q_2$ have both high gains and the base current is small compared with the collector current and therefore it is possible to assume that the collector current of the transistor $Q_1$ is equal to the current $I_1$.

If a curernt supplied from the battery $E_1$ to the circuit consisting of the load $Z_2$, the transistor $Q_2$, the resistor $R_2$ and the load $Z_3$ is represented by a current $I_2$, similarly the voltage V across terminals 1 and 4 is shown by the following formula.

$$V=V_{be2}+I_2R_2$$

where:

$V_{be2}$=voltage across base and emitter of transistor $Q_2$
$R_2$=resistance value of resistor $R_2$.

As it is possible to make the difference between the voltages $V_{be1}$ and $V_{be2}$ extremely small, the following relation can be obtained.

$$I_1R_1=I_2R_2$$

By changing the above equation, it is obtained that $$I_2=\frac{R_1}{R_2}I_1$$

The above equation means that the current $I_2$ which is obtained by multiplying the constant current $I_1$ flowing through the load $Z_1$ by the multiplication factor $R_1/R_2$ flows through the loads $Z_2$ and $Z_3$.

The direction connecting the base-emitter junction of the transistors $Q_1$ and $Q_2$ is arranged in such a direction that the above voltages $V_{be1}$ and $V_{be2}$ compensate each other against the heat of their own generation and the variations of ambient temperature. Consequently, the variations of the voltages $V_{be1}$ and $V_{be2}$ due to the change of temperature cancel each other and no error will take place in the circuit.

Thus the connection of two transistors of mutually different polarities makes it possible to reduce the conversion errors compared with the case where only one transistor is used.

As stated above, from across terminals 1 and 4 and from across terminals 5 and 4 can be taken out respectively different voltage outputs $I_1R_1+V_{be1}$ and $I_2R_2$.

Instead of the transistors $Q_1$ and $Q_2$, if composite transistor circuits consisting of a combination of two or more transistors are employed, the conversion accuracy can be improved as the input impedance becomes high and the current amplification factor increases. In addition, as it is possible to make the collector current small in the first stage of the composite transistor circuit, the compensation for the voltage across the base and emitter against the self-generated heat and ambient temperature variation will be extremely improved.

Figure 2:
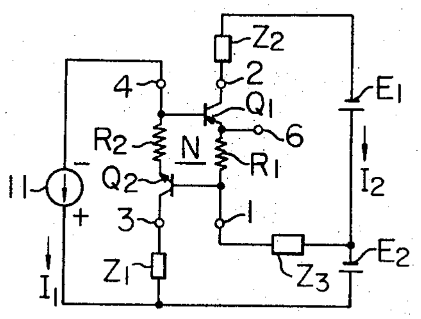

FIG. 2 shows the method to connect the various components in case the polarities of constant current power source 11 in FIG. 1 are reversed.

Figures 3, 4:
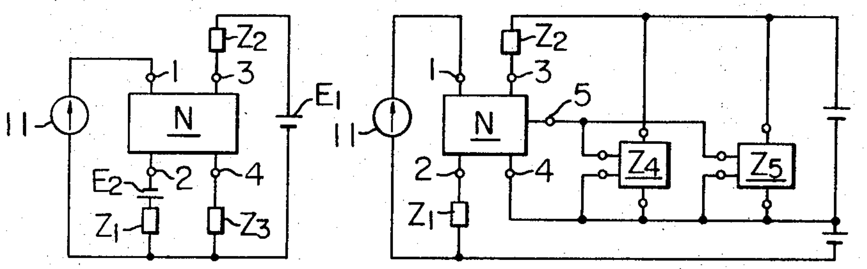

FIG. 3 shows a connection diagram in case the power source $E_2$ is inserted between terminal 2 and the load $Z_1$ in FIG. 1. This type of connection is employed when it is more desirable to supply power separately from an inverter as the power source $E_2$ in such a common direct current power source system as impresses a direct current 24 volt voltage to the individual instuments.

FIG. 4 shows an arrangement where the loads $Z_4$ and $Z_5$ are connected in parallel in addition between terminals 4 and 5 in FIG. 1.

Figure 5:
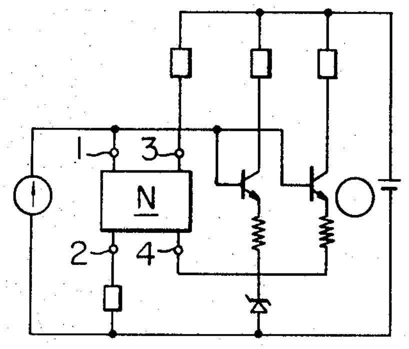

FIG. 5 shows a connecting method capable of taking out a current output in parallel using a transistor which does not especially compensate for the voltage across the base and emitter in FIG. 1.

Figure 6:
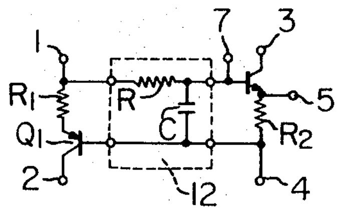
FIG. 6 is a connection diagram showing an embodiment of the electric current converting circuit of this invention.

FIG. 6 shows a variation where a filter is inserted in the four-terminal network of FIG. 1. A filter 12 is inserted between the connection of terminal 1 and the base of the transistor $Q_1$ and the connection of the base of the transistor $Q_2$ and terminal 4, and a terminal 7 is taken out from the base of the transistor $Q_2$.

If current ripples or induced noises are contained in the current $I_1$, it is possible, according to the current conversion circuit of this invention, to remove unnecessary high frequency components from the current loads such as the loads $Z_1$ and $Z_2$ and from such voltage outputs as can be obtained across terminals 4 and 5 or across terminals 4 and 7.

If a filter is installed in this manner, the time constant of the filter can be increased while maintaining a low impedance and the conversion performance can be improved.

What is claimed is:

1. An electric current converting circuit comprising:

a pair of transistors having mutually different polarities, a pair of resistors connecting the emitters of the respective transistors to the base of the other transistors, a constant current power source and a first load connected in series with a circuit composed of one of the transistors and one of the resistors, a second load, a current power source and a third load connected in series with a circuit composed of the other of the transistors and the other of the resistors, a separate current power source connecting the first load to the third load, and a filter circuit connected between said two circuits.

References Cited

UNITED STATES PATENTS

| | | | |
|---|---|---|---|
| 2,979,666 | 4/1961 | Erath | 330—17 |
| 3,271,528 | 9/1966 | Vallese | 330—30 |
| 3,383,612 | 5/1968 | Harwood | 330—22 |

DONALD D. FORRER, Primary Examiner

R. C. WOODBRIDGE, Assistant Examiner

U.S. Cl. X.R.

307—297, 313; 323—4; 330—17, 24